United States Patent
Perzon et al.

(10) Patent No.: US 10,665,352 B2
(45) Date of Patent: May 26, 2020

(54) CORE PLATE ASSEMBLY, AND A METHOD OF PERFORMING WORK ON A CORE PLATE ASSEMBLY

(71) Applicant: Westinghouse Electric Sweden AB, Västerås (SE)

(72) Inventors: Sven Perzon, Västerås (SE); Yann Le Moigne, Västerås (SE); Henrik Remahl, Västerås (SE); Tobias Strömgren, Västerås (SE)

(73) Assignee: Westinghouse Electric Sweden AB, Västerås (SE)

( * ) Notice: Subject to any disclaimer, the term of this patent is extended or adjusted under 35 U.S.C. 154(b) by 257 days.

(21) Appl. No.: 15/801,736

(22) Filed: Nov. 2, 2017

(65) Prior Publication Data

US 2018/0182499 A1 Jun. 28, 2018

(51) Int. Cl.
*G21C 3/322* (2006.01)
*G21C 3/33* (2006.01)
G21C 1/08 (2006.01)
G21C 15/243 (2006.01)
G21C 5/06 (2006.01)

(52) U.S. Cl.
CPC ............. *G21C 3/322* (2013.01); *G21C 3/33* (2013.01); *G21C 3/3305* (2013.01); *G21C 1/084* (2013.01); *G21C 5/06* (2013.01); *G21C 15/243* (2013.01); *Y02E 30/31* (2013.01)

(58) Field of Classification Search
CPC ....... G21C 3/322; G21C 3/3305; G21C 3/334
See application file for complete search history.

(56) References Cited

U.S. PATENT DOCUMENTS

| 4,904,443 A | 2/1990 | Carruth |
| 5,646,970 A | 7/1997 | Thompson |
| 2003/0185334 A1 | 10/2003 | Fujii et al. |
| 2008/0152068 A1 | 6/2008 | Aktas et al. |

FOREIGN PATENT DOCUMENTS

JP    H05 84578    4/1993

OTHER PUBLICATIONS

Extended European Search Report issued in corresponding EP application No. 16196979.5, dated May 10, 2017, pp. 1-9.

*Primary Examiner* — Sharon M Davis
(74) *Attorney, Agent, or Firm* — Murtha Cullina LLP (57) ABSTRACT

A core plate assembly for a boiling water reactor, and a method of performing work thereon are disclosed. The core plate assembly comprises a core plate having through-going apertures, and a beam structure comprising parallel first beams and parallel second beams being perpendicular to the first beams. The beams enclose a plurality of rectangular areas each enclosing four of the through-going apertures. Control rod guide tubes are aligned with a respective one of the through-going apertures. A transition pieces is received in a respective one of the control rod guide tubes, and has four passages for communicating with a respective fuel assembly. Each passage permits a coolant flow into the respective fuel assembly. A flow inlet is provided for the coolant into each passage. At least one of the flow inlets has a cross-sectional shape deviating from a circular shape.

12 Claims, 7 Drawing Sheets

CORE PLATE ASSEMBLY, AND A METHOD OF PERFORMING WORK ON A CORE PLATE ASSEMBLY

CROSS REFERENCE TO RELATED APPLICATION

The present application claims priority benefit under European Patent Application No. 16196979.5 filed on Nov. 3, 2016, the entirety of which is incorporated by reference herein.

TECHNICAL FIELD OF THE INVENTION

The present invention refers to a core plate assembly for a boiling water reactor of a nuclear plant. The invention also refers to a method of performing work on a core plate assembly of a boiling water reactor of a nuclear plant.

BACKGROUND OF THE INVENTION AND PRIOR ART

The core plate assembly separates the core of fuel assemblies of the boiling water reactor from the lower plenum provided beneath the core plate assembly.

U.S. Pat. No. 5,646,970 discloses a control rod guide tube and a core plate with a plurality of through-going apertures. A transition piece for four fuel assemblies is provided in each of the through-going apertures and comprises four passages for coolant to the respective fuel assembly. Flow inlets to the passages are provided. The flow inlets are formed by a respective orifice which has a circular shape.

U.S. Pat. No. 4,904,443 discloses a control rod drive with upward removable drive internals, and a core plate with a plurality of through-going apertures. A transition piece for four fuel assemblies is provided in each of the through-going apertures and comprises four passages for coolant to the respective fuel assembly. Flow inlets to the passages are provided. The flow inlets are formed by a respective orifice which has a circular shape.

When the coolant is flowing from the lower plenum through the flow inlet into the passage of the transition piece, vortices are created due to the complex geometry outside the transition piece. These vortices fluctuate at the orifice of the flow inlet, which can lead to a pulsating mass flow through the orifice. Thus, the pressure in and behind the orifice will fluctuate, which leads to a pressure loss coefficient through the orifice that varies with time. This will cause an intermittent mass flow through the respective passage and fuel assembly that can lead to a cooling deficiency, and in a worse case can cause dry-out events in the fuel assembly.

SUMMARY OF THE INVENTION

The object of the present invention is to overcome the problems discussed above.

This object is achieved by the core plate assembly initially defined, which is characterized in that at least one of the flow inlets has a cross-sectional shape deviating from a circular shape.

The non-circular cross-sectional shape of the flow inlet leads to a decrease of the mass flow fluctuation discussed above. The non-circular cross-sectional shape will contribute to locking the vortices. This will decrease the fluctuation of the mass flow substantially. A more smooth and uniform flow of coolant into and through the passage into the respective fuel assembly will thus be achieved. The deviation from the prior art circular orifice will thus decrease the probability of cooling deficiency and dry-out issues.

According to an embodiment of the invention, the cross-sectional shape of the flow inlet comprises a hole comprising a circular hole and a first recess extending from the circular hole. The circular hole of the prior art may thus be modified so that a first part of the edge of the hole has a larger distance to the center of the circular hole than the remaining part of the edge of the hole. Advantageously, said first part may be a minor part of the edge and the remaining part may be a major part of the edge.

According to a further embodiment of the invention, the first recess extends in sideward direction from the circular hole.

According to a further embodiment of the invention, the sideward direction is perpendicular to the longitudinal axis of the fuel assemblies and reactor vessel of the boiling water reactor, or may be inclined in relation to the longitudinal axis x.

According to a further embodiment of the invention, the cross-sectional shape of the flow inlet comprises a second recess extending in sideward direction from the circular hole. The circular hole of the prior art may thus be modified so that a first part and a second part of the edge of the hole have a larger distance to the center of the circular hole than the remaining part of the edge of the hole.

According to further embodiment of the invention, the sideward direction of the second recess is perpendicular to the longitudinal axis of the fuel assemblies and the boiling water reactor, or may be inclined in relation to the longitudinal axis x.

According to a further embodiment of the invention, the first recess and the second recess are provided opposite to each other.

According to a further embodiment of the invention, the at least one flow inlet is located between an upper end of the beam structure and a lower end of the beam structure. Advantageously, the at least one flow inlet is located between an upper end of the first and second beams and a lower end of the first and second beams.

According to a further embodiment of the invention, the at least one flow inlet is located opposite to a corner between one of the first beams and one of the second beams.

According to a further embodiment of the invention, the flow inlet extends through a first hole through the control rod guide tube and a second hole through the transition piece. Advantageously, the control rod guide tube may be located outside the transition piece. The control rod guide tube may extend through the respective through-going aperture of the core plate.

According to a further embodiment of the invention, the cross-sectional shape of the flow inlet is determined by the second hole through the transition piece.

According to a further embodiment of the invention, the cross-sectional shape of the flow inlet is determined by the first hole through the control rod guide tube.

According to a further embodiment of the invention, a sheet is provided between the transition piece and the control rod guide tube, wherein the flow inlet extends through a third hole through the sheet, and wherein the cross-sectional shape of the flow inlet is determined by the third hole.

According to a further embodiment of the invention, the sheet is joined, or permanently joined, to the transition piece, for instance through welding.

The object is also achieved by the method initially defined, which is characterized in by the step of: removing one of the fuel assemblies from the boiling water reactor, introducing an elongated tool into the boiling water reactor and into the passage from which said fuel assembly was removed, positioning a tool head of the elongated tool in the proximity of the flow inlet of said passage, and actuating the tool head to cut the flow inlet to said cross-sectional shape deviating from a circular shape.

By means of the method, the problem of mass flow fluctuations discussed above, may be removed in a convenient and efficient manner, also from existing boiling water reactors.

BRIEF DESCRIPTION OF THE DRAWINGS

The present invention is now to be explained more closely through a description of different embodiments and with reference to the drawings attached hereto.

DETAILED DESCRIPTION OF VARIOUS EMBODIMENTS

Figure 1:
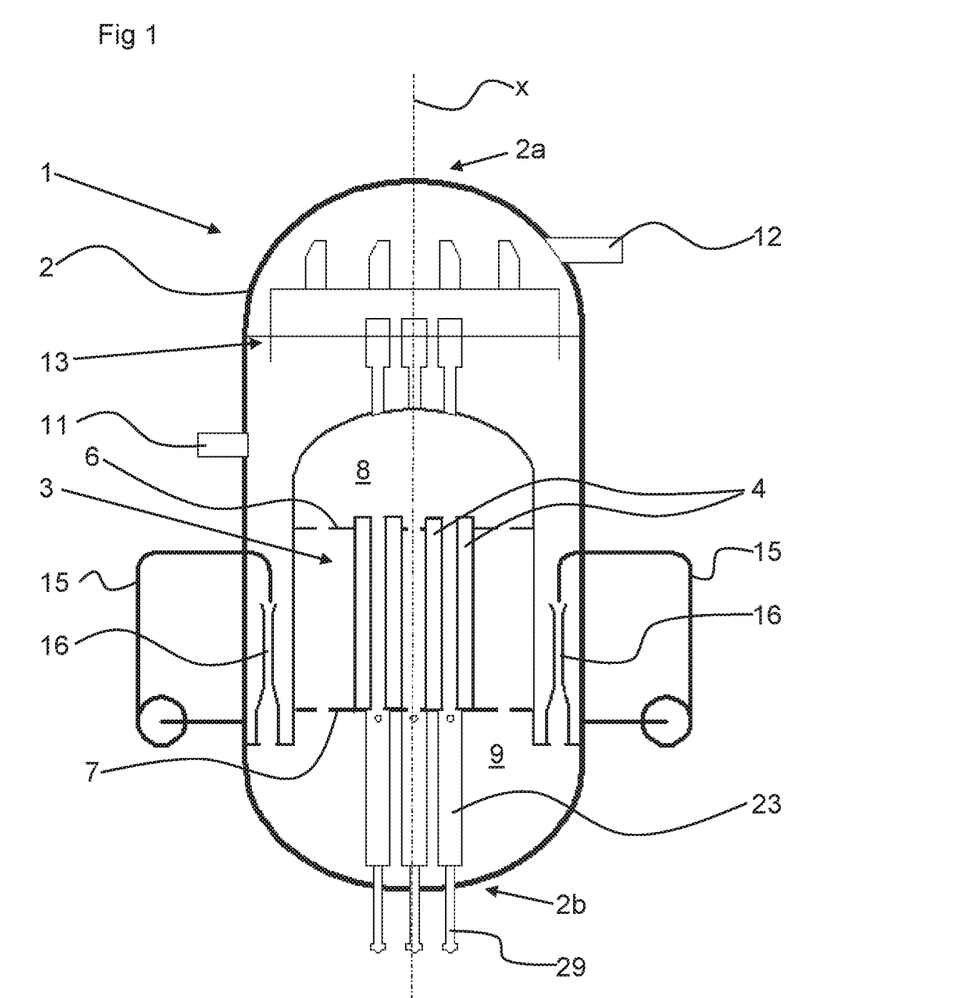
FIG. 1 discloses schematically a sectional view of a boiling water reactor.

FIG. 1 discloses schematically a boiling water reactor 1 of a nuclear plant. The boiling water reactor 1 comprises a reactor vessel 2, which encloses a core 3 comprising a plurality of fuel assemblies 4. Only a few fuel assemblies 4 are shown in FIG. 1. The fuel assemblies 4 may be arranged in fuel bundles, each fuel bundle comprising four fuel assemblies 4. Each fuel assembly 4 comprises a plurality of fuel rods (not disclosed) with nuclear fuel in a known manner.

The fuel assemblies 4 are elongated and arranged in parallel with a longitudinal axis x of the reactor vessel 2. The longitudinal axis x may extend vertically through an upper end 2a and a lower end 2b of the reactor vessel 2.

Figure 2:
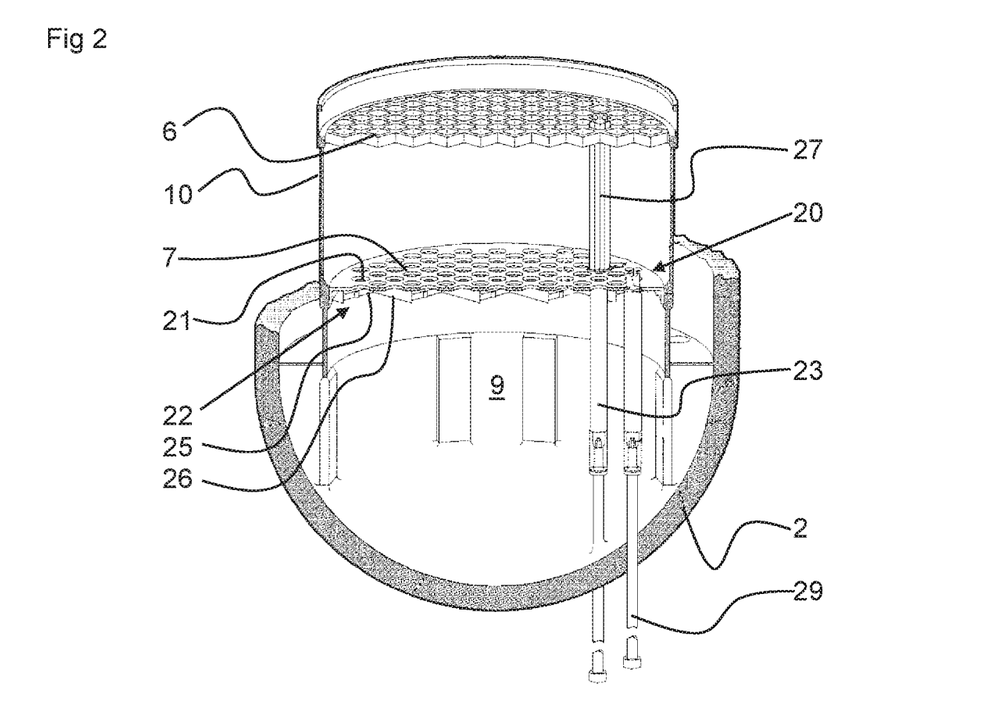
FIG. 2 discloses schematically a sectional view of a shroud and core plates of the boiling water reactor in FIG. 1.

The core 3 may be provided between an upper core plate 6 and a lower core plate 7, see also FIG. 2.

An upper plenum 8 is provided above the upper core plate 6.

A lower plenum 9 is provided beneath the lower core plate 7.

The core 3 is enclosed by a shroud 10.

The boiling water reactor 1 also comprises a feed water inlet 11, a steam outlet 12, a steam separation arrangement 13, and a number of recirculation loops 15.

Each recirculation loop 15 may have a jet pump 16 securing a flow of coolant from the lower plenum 9 upwards through the core 3.

The lower core plate 7 is comprised by a core plate assembly 20, see FIG. 2. The lower core plate 7 comprises a plurality of through-going apertures 21.

Figure 3:
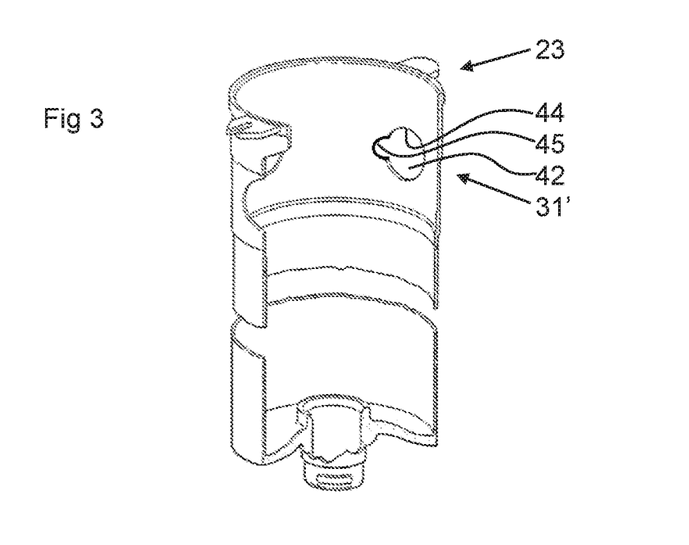
FIG. 3 discloses schematically a sectional view of control rod guide tube of the boiling water reactor in FIG. 1.
Figure 4:
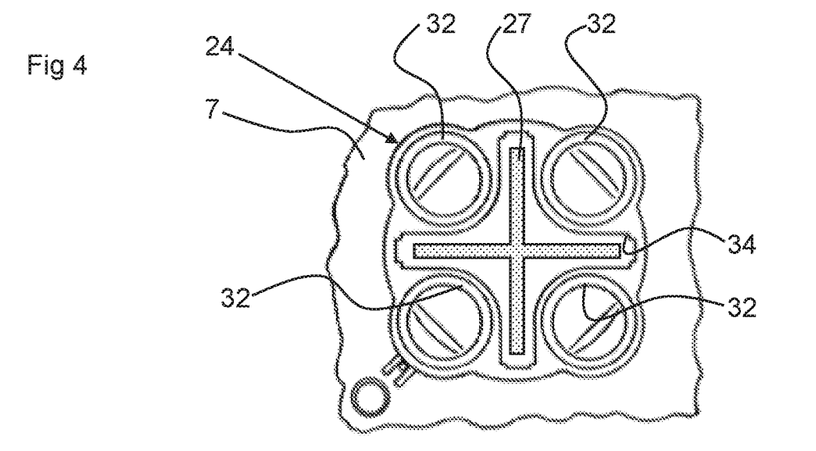
FIG. 4 discloses schematically a view from above of a transition piece of the boiling water reactor in FIG. 1.
Figure 5:
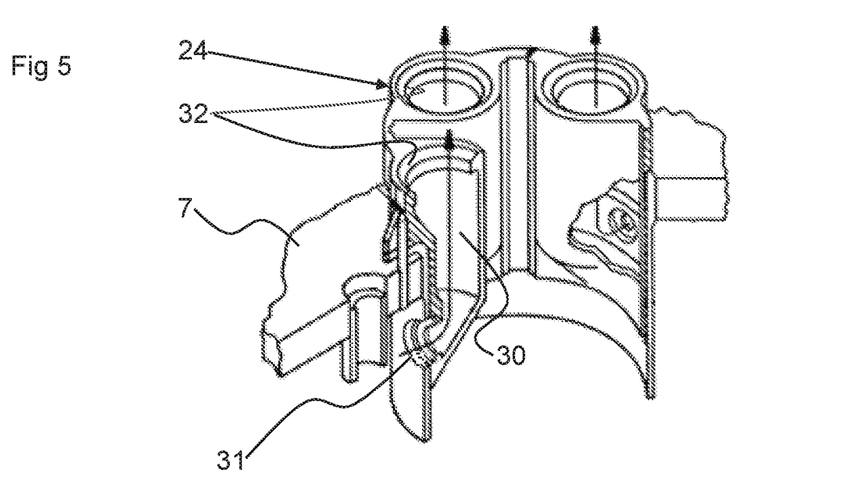
FIG. 5 discloses schematically a sectional view of the transition piece in FIG. 4.

The core plate assembly 20 also comprises a beam structure 22, a plurality of control rod guide tubes 23, see also FIG. 3, and a plurality of transition pieces 24, see also FIGS. 4 and 5.

Figure 7:
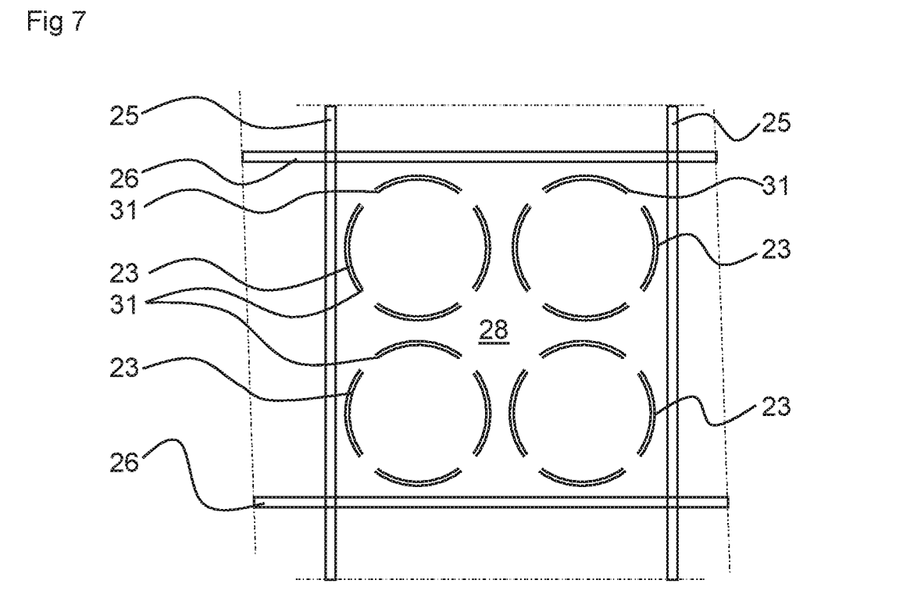
FIG. 7 discloses schematically a cross-sectional view through a beam structure of boiling water reactor in FIG. 1.

The beam structure 22 comprises a plurality of parallel first beams 25 and a plurality of parallel second beams 26, see FIGS. 2 and 7. The first beams 25 extend perpendicularly to the second beams 26. The first and second beams 25, 26 may be formed by flat beams having an elongated, rectangular cross-section.

The beam structure 22, i.e. the first and second beams 25, 26, is provided beneath the core plate 7, and may be welded to the core plate 7.

The first and second beams 25, 26 enclose a plurality of rectangular areas 28 beneath the core plate 7, see FIG. 7. Each of the rectangular areas 28 encloses four of said through-going apertures 21.

Each of the control rod guide tubes 23 is aligned with a respective one of the through-going apertures 21. The control rod guide tube 23 extends into the through-going aperture 21 and is attached to the lower core plate 7, see FIGS. 5 and 6. Each control rod guide tube 23 houses a respective control rod 27, see FIG. 2.

A control rod drive 29 is provided for each control rod 27 for the upward movement of the control rod 27 into the core 3, and for the downward movement of the control rod 27 out of the core 3.

Figure 6:
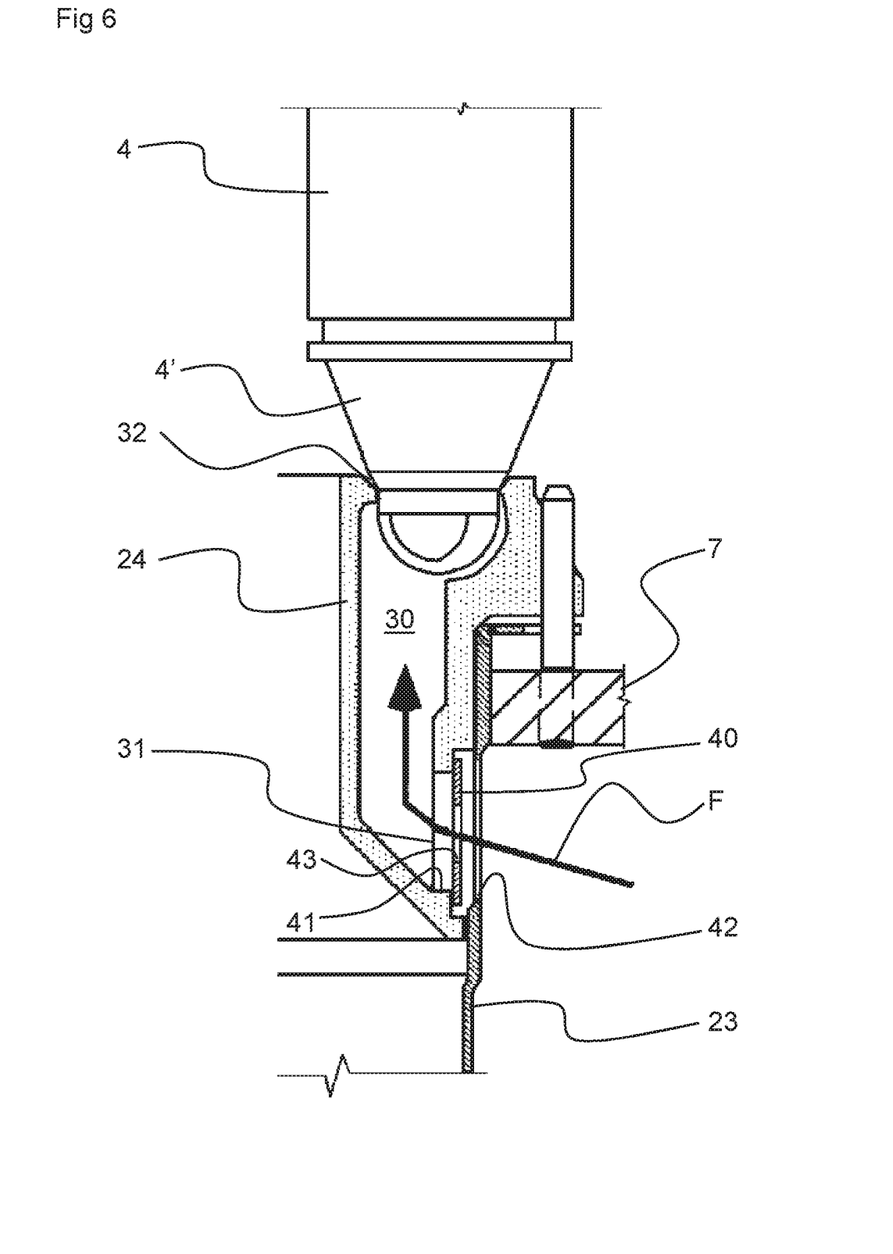
FIG. 6 discloses schematically a sectional view through a part of the transition piece in FIG. 4.

Each transition pieces 24 is received in a respective one of the control rod guide tubes 23, see FIGS. 5 and 6, and has four passages 30 for communicating with a respective fuel assembly 4. Each passage 30 permits a coolant flow F into the respective received fuel assembly 4 as is illustrated in FIG. 6.

Each passage 30 of the transition piece 24 has a flow inlet 31 and a flow outlet 32. The fuel assembly 4 is received in a seat of the flow outlet 32, as can be seen in FIG. 6, wherein a lower conical part 4' is securely positioned in relation to the transition piece 24. The coolant may thus, as indicated by the arrow F, flow from the lower plenum 9 into the passage 30 via the flow inlet 31 and further into the fuel assembly 4 via the flow outlet 32.

Each transition piece 24 also has a cross-shaped control rod channel 34, through which the control rod 27 may be guided into the core 3, see FIG. 4.

Each transition piece 24 thus have four flow inlets 31, one for each passage 30, see FIG. 7. The four flow inlets 31 are orthogonal with respect to each other.

The four flow inlets 31, 31' are located between an upper end of the first and second beams 25, 26 and a lower end of the first and second beams 25, 26. One 31' of the flow inlets 31, 31' of each transition piece 24 is located opposite to a corner between one of the first beams 25 and one of the second beams 26 as can be seen in FIG. 7.

Each flow inlet 31, 31' extends through a first hole 41 through the transition piece 24 and a second hole 42 through the control rod guide tube 23, see FIG. 3.

In a first embodiment, a sheet 40 is provided between the transition piece 24 and the control rod guide tube 23, see FIG. 6. The flow inlet 31, 31' also extends through a third hole 43 through the sheet 40. The sheet 40 is joined, or permanently joined, to the transition piece 24, for instance through welding.

It should be noted that the sheet 40 alternatively may be joined, or permanently joined, to the control rod guide tube 23, for instance through welding.

At least the flow inlet 31' located opposite to the corner of the first and second beams 25, 26 have a cross-sectional shape deviating from a circular shape. In the first embodiment, the cross-sectional shape of the flow inlet 31' is determined by the third hole 43 through the sheet 40.

Figure 8:
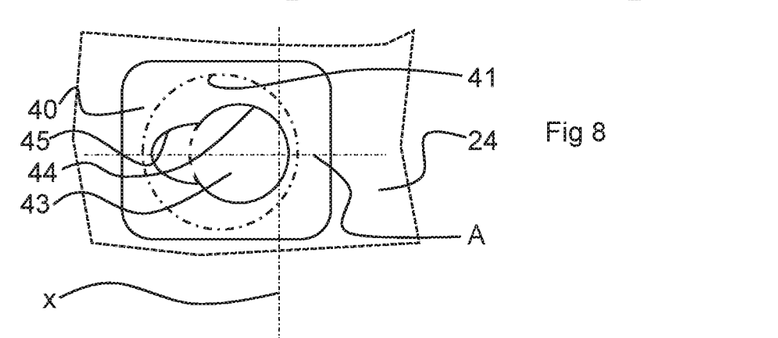
FIG. 8 discloses schematically a front view of a flow inlet according to a first embodiment of the invention.

In the first embodiment, the cross-sectional shape of the at least one flow inlet 31' comprises a circular hole 44 and a first recess 45 extending from the circular hole 44 as can be seen in FIG. 8. The first recess 45 extends in a sideward direction A from the circular hole 44 with respect to the longitudinal axis x of the reactor vessel 2. The sideward direction A may be perpendicular to the longitudinal axis x, or may be inclined in relation to the longitudinal axis x. For instance, the sideward direction A may lie within an angle range from −60° to +60° in relation to the longitudinal axis x, preferably from −45° to +45° in relation to the longitudinal axis x, and more preferably from −30° to +30° in relation to the longitudinal axis x.

The circular hole 44, which corresponds to the flow inlet of the prior art, has thus been modified so that a first part of the edge of the third hole 43, i.e. the part of the first recess 45, has a larger distance to the center of the circular hole 44 than the remaining part of the edge of the circular hole 44. In the first embodiment the first part forms a minor part of the edge and the remaining part forms a major part of the edge.

Figure 9:
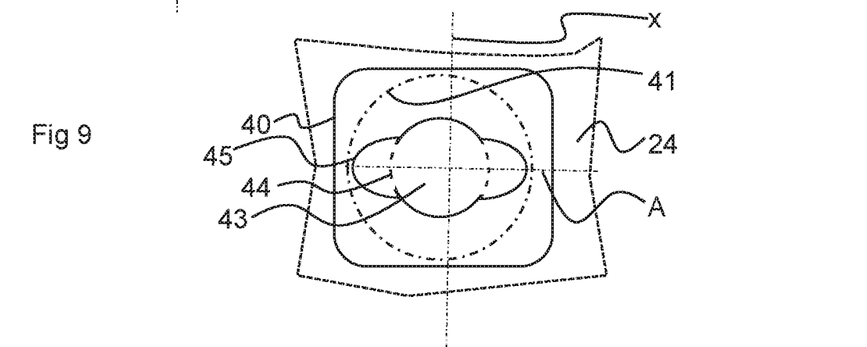
FIG. 9 discloses schematically a front view of a flow inlet according to a second embodiment of the invention.

FIG. 9 discloses a second embodiment, which differs from the first embodiment in that the cross-sectional shape of the at least one flow inlet 31' also comprises a second recess 46 extending in a sideward direction A from the circular hole 44. The first recess 45 and the second recess 46 are provided opposite to each other. Also in this case, the sideward direction A may be perpendicular to the longitudinal axis x, or may be inclined in relation to the longitudinal axis x, for instance within the angle ranges mentioned above.

The circular hole 44 has thus been modified so that a first part and a second part of the edge of the third hole 43 has a larger distance to the center of the circular hole 44 than the remaining part of the edge of the third hole 44. The first part and the second part may together form a minor part of the edge and the remaining part may form a major part of the edge.

Figure 10:
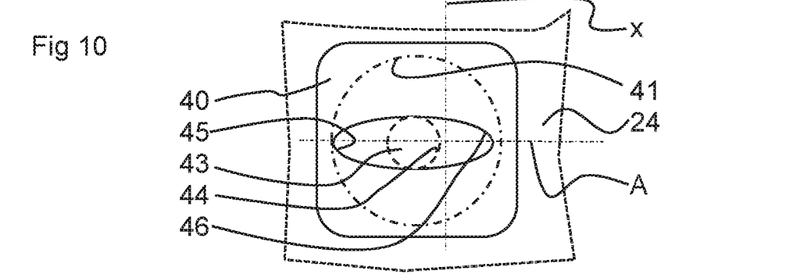
FIG. 10 discloses schematically a front view of a flow inlet according to a third embodiment of the invention.

FIG. 10 discloses a third embodiment, which differs from the second embodiment in that the first part and the second part together form a major part of the edge, wherein the remaining part of the edge is zero or close to zero.

In the first, second and third embodiments, the first hole 41 and the second hole 42 may be circular holes, which have a diameter that is greater than the largest extension of the third hole 43, see FIGS. 6 and 8-10.

FIG. 3 illustrates a fourth embodiment, which differs from the first, second and third embodiments in that the cross-sectional shape of the at least one flow inlet 31' is determined by the second hole 42 through the control rod guide tube 23. It should be noted that the second hole 42 of the fourth embodiment may have any one of the shapes disclosed for the third hole 43 in FIGS. 8-10.

Figure 11:
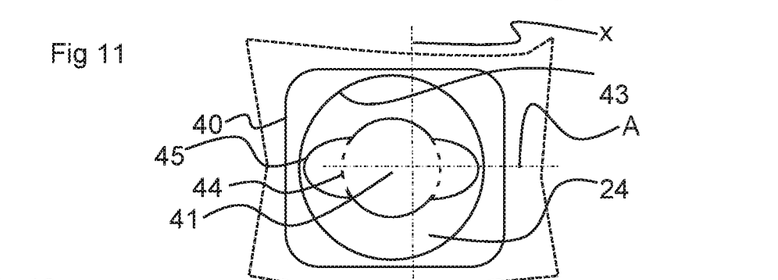
FIG. 11 discloses schematically a front view of a flow inlet according to a fifth embodiment of the invention.

FIG. 11 discloses a fifth embodiment, which differs from the previous embodiments in that the cross-sectional shape of the at least one flow inlet 31' is determined by the first hole 41 through the transition piece 24. It should be noted that the first hole 41 of the fifth embodiment may have any one of the shapes disclosed for the third hole 43 in FIGS. 8-10.

Figure 12:
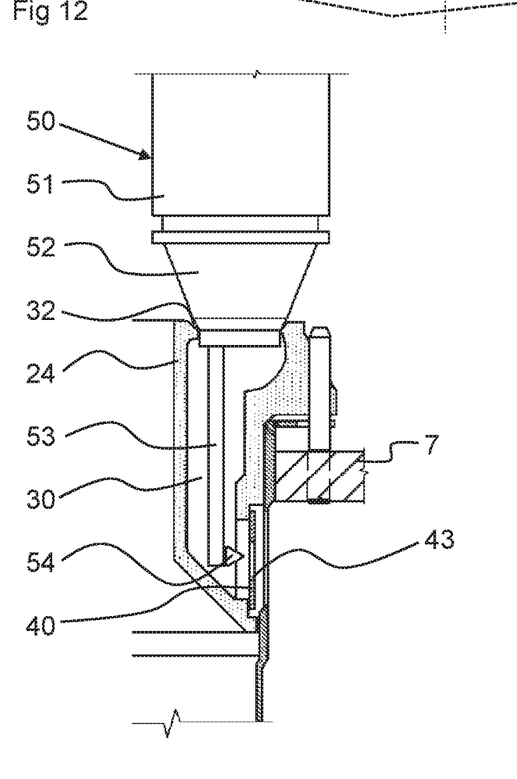
FIG. 12 discloses schematically a view of a part of an elongated tool in a work performing position in the boiling water reactor.
Figure 13:
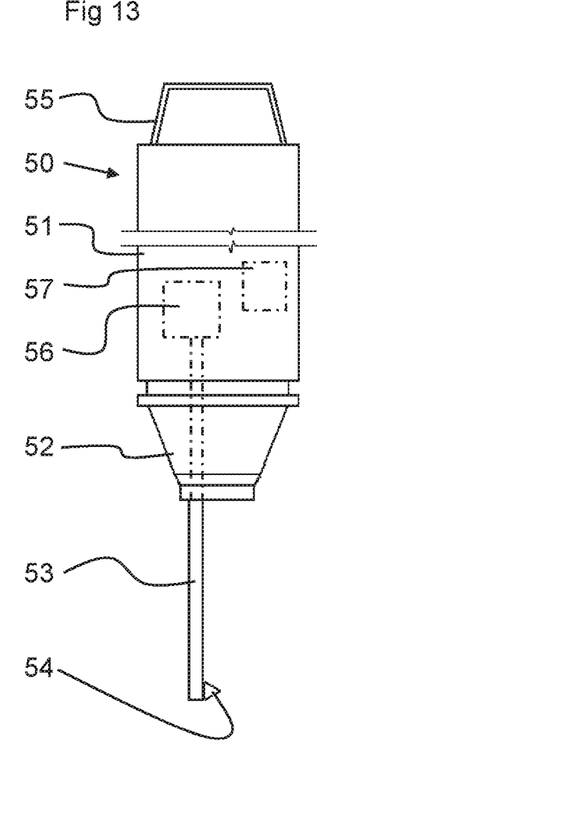
FIG. 13 discloses schematically a side view of the elongated tool in FIG. 12.

FIGS. 12 and 13 disclose an elongated tool 50 which is suitable for modifying an existing flow inlet 31 having a circular hole. The elongated tool 50 comprises an elongated housing 51, which may have the shape and the dimension of a fuel box of a conventional fuel assembly 4. The elongated hosing 51 may thus be laterally supported in the core 3 by the upper core plate 6 and the lower core plate 7.

The elongated housing 51 may thus have a rectangular or square cross-section. The length of the elongated housing 51 may be 3.5 to 4.5 m.

The elongated tool 50 also comprises a lower conical part 52, which also may have the shape and the dimension of the corresponding lower part 4' of a conventional fuel assembly 4. The lower conical part 52 fits into the seat of the outlet 32 of the transition piece 24, preferably in the same way as the lower conical part of a conventional fuel assembly 4.

The elongated tool 50 also comprises a tool shaft 53 and a tool head 54. The tool head 54 may comprise or consist of an electric spark cutting head. By means of such electric spark cutting head, the non-circular shape may easily be obtained, for instance by cutting the first recess 45 and/or the second recess 46.

Furthermore, the elongated tool 50 may have a handle 55 at the upper end, which permits handling of the elongated tool 50, in particular by means of the handling device normally provided at the nuclear plant for lifting fuel assemblies 4 out of the boiling water reactor 1 and for inserting fuel assemblies 4 into the boiling water reactor 1.

The elongated tool 50 also comprises a drive member 56 for positioning the tool head 54, especially in relation to the circular hole 44, and a current supply device 57 for supplying electric current to the electric spark cutting head of the tool head 54. The drive member 56 and the current supply device 57 may be provided within the elongated housing 51 as can be seen in FIG. 13.

When an existing circular hole of the flow inlet 31 is to be modified, the respective fuel assembly 4 is removed from the boiling water reactor 1. The elongated tool 50 is introduced into the boiling water reactor 1 so that the lower conical part 52 is securely received in the flow outlet 32 of the transition piece 24, from which flow outlet 32 said fuel assembly 4 was removed. The tool head 54 is then positioned in the proximity of the flow inlet 31' of the passage 30. Thereafter, the tool head 54 is actuated to cut the flow inlet 31' to said cross-sectional shape deviating from the circular shape 44.

Figure 14:
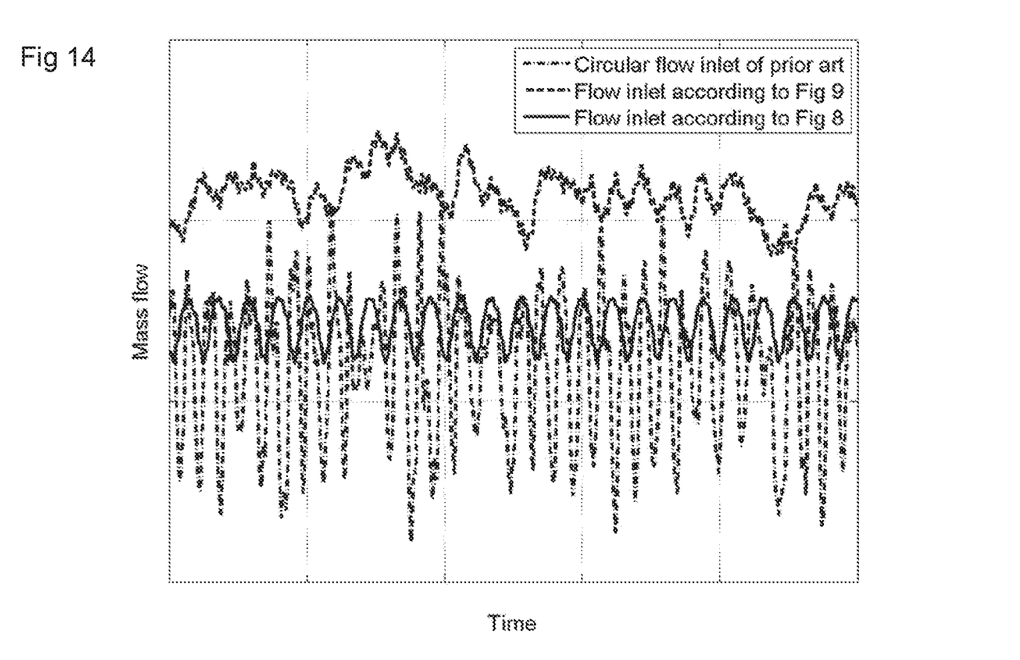
FIG. 14 discloses a diagram of the mass flow over time through different flow inlets.
Figure 15:
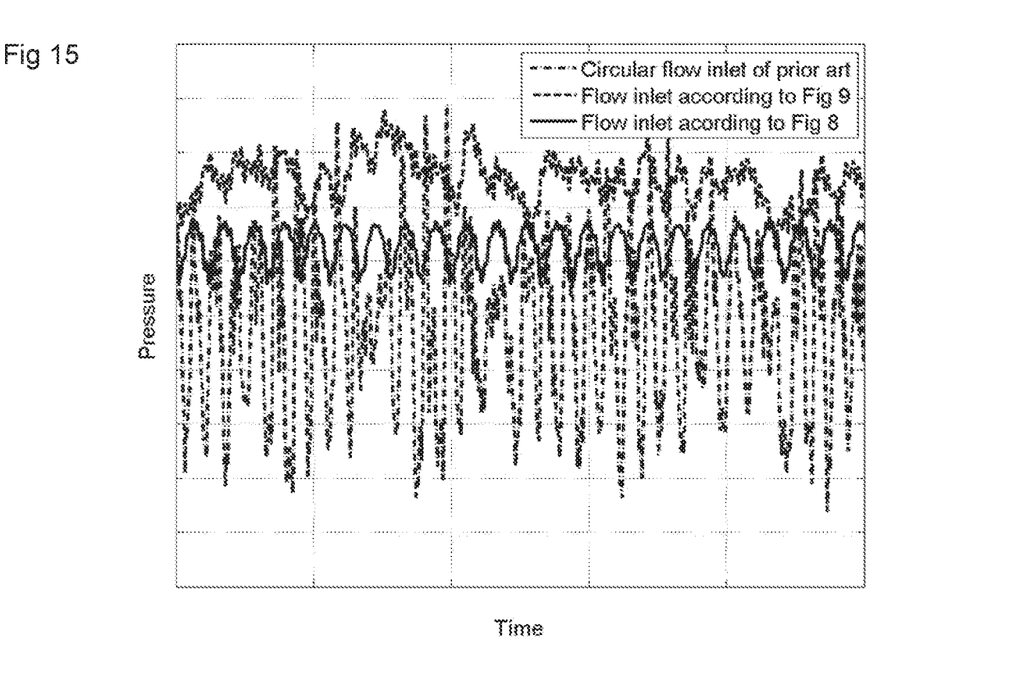
FIG. 15 discloses a diagram of the pressure over time through different flow inlets.

FIGS. 14 and 15 are diagrams over simulations of the mass flow and the pressure, respectively, which have been made through one of the flow inlets 31, 31'. The simulations are made for the flow inlet 31' being opposite to the corner between the first beam 25 and the second beam 26.

FIG. 14 discloses a diagram showing how the mass flow varies over time through a flow inlet having a circular cross-section according to the prior art and the flow inlets 31, 31' of the first and fourth embodiments shown in FIGS. 8 and 3, and the flow inlets 31, 31' of the second and fifth embodiments shown in FIGS. 9 and 11.

The flow inlet 31, 31' of the third embodiment shown in FIG. 10 can be assumed to result in a mass flow similar to the one of the second and fifth embodiments.

As can be seen the mass flow is significantly more constant for the flow inlets according to the invention than for the flow inlet of the prior art. Thus the fluctuations of the mass flow have been reduced, or significantly reduced, by means of the flow inlet according to the first to fifth embodiments.

FIG. 15 discloses a diagram showing how the pressure varies over time through a flow inlet having a circular cross-section according to the prior art and the flow inlets 31, 31' of the first and fourth embodiments shown in FIGS. 8 and 3, and the flow inlets 31, 31' of the second and fifth embodiments shown in FIGS. 9 and 11.

The flow inlet 31, 31' of the third embodiment shown in FIG. 10 can be assumed to result in a pressure similar to the one of the second and fifth embodiments.

In the same way as for the mass flow, also the pressure is significantly more constant for the flow inlets according to the invention than for the flow inlet of the prior art. Thus the fluctuations of the pressure have been reduced, or significantly reduced, by means of the flow inlet according to the first to fifth embodiments.

The invention is not limited to the embodiments disclosed, but may be varied and modified within the scope of the following claims.

The invention claimed is:

1. A core plate assembly for a boiling water reactor of nuclear plant, comprising:
   a core plate having a plurality of through-going apertures;
   a beam structure comprising a plurality of parallel first beams and a plurality of parallel second beams being perpendicular to the first beams, wherein the first and second beams enclose a plurality of rectangular areas beneath the core plate, wherein each of the rectangular areas encloses four of said through-going apertures;
   a plurality of control rod guide tubes, each being aligned with a respective one of the through-going apertures; and
   a plurality of transition pieces, each being received in a respective one of the control rod guide tubes, and each having four passages for communicating with a respective fuel assembly, each passage permitting a coolant flow into the respective fuel assembly,
   wherein a respective flow inlet for the coolant into each passage is provided,
   wherein at least one of the flow inlets has a non-circular cross-sectional shape, wherein the non-circular cross-sectional shape comprises a circular hole with a first recess extending therefrom.

2. A core plate assembly according to claim 1, wherein the first recess extends in sideward direction from the circular hole.

3. A core plate assembly according to claim 1, wherein the cross-sectional shape of the at least one flow inlet comprises a second recess extending in sideward direction from the circular hole.

4. A core plate assembly according to claim 3, wherein the first recess and the second recess are provided opposite to each other.

5. A core plate assembly according to claim 1, wherein the flow inlet is located between an upper end of the first and second beams and a lower end of the first and second beams.

6. A core plate assembly according to claim 1, wherein the at least one flow inlet is located opposite to a corner between one of the first beams and one of the second beams.

7. A core plate assembly according to claim 1, wherein the flow inlet extends through a first hole through the transition piece and a second hole through the control rod guide tube.

8. A core plate assembly according to claim 7, wherein the cross-sectional shape of the at least one flow inlet is determined by the first hole.

9. A core plate assembly according to claim 7, wherein the cross-sectional shape of the at least one flow inlet is determined by the second hole.

10. A core plate assembly according to claim 7, wherein a sheet is provided between the transition piece and the control rod guide tube, wherein the flow inlet extends through a third hole through the sheet, and wherein the cross-sectional shape of the at least one flow inlet is determined by the third hole.

11. A core plate assembly according to claim 10, wherein the sheet is joined to the transition piece.

12. A method of performing work on a core plate assembly of a boiling water reactor of a nuclear plant, the core plate assembly comprising:
   a core plate having a plurality of through-going apertures,
   a beam structure comprising a plurality of parallel first beams and a plurality of parallel second beams being perpendicular to the first beams, wherein the first and second beams enclose a plurality of rectangular areas beneath the core plate, wherein each of the rectangular areas encloses four of said through-going apertures,
   a plurality of control rod guide tubes, each being received in a respective one of the through-going apertures, and
   a plurality of transition pieces, each being received in a respective one of the control rod guide tubes, and each having four passages for receiving a respective fuel assembly, each passage permitting a coolant flow into the respective fuel assembly,
   wherein a respective flow inlet for the coolant into each passage is provided,
   the method comprising the steps of:
   removing one of the fuel assemblies from the boiling water reactor,
   introducing an elongated tool into the boiling water reactor and into the passage from which said fuel assembly was removed;
   positioning a tool head of the elongated tool in the proximity of the flow inlet of said passage; and
   actuating the tool head to cut said flow inlets to a non-circular cross-sectional shape.

* * * * *